UNITED STATES PATENT OFFICE 2,506,310

LUBRICATING OIL COMPOSITION

Louis A. Mikeska, Westfield, N. J., assignor to Standard Oil Development Company, a corporation of Delaware No Drawing. Application December 28, 1946, Serial No. 719,119

15 Claims. (Cl. 252—32.7)

This invention relates to a mineral lubricating oil and more particularly to a new type of additive which imparts pour stabilizing properties to such oil and improves other properties of the same.

In accordance with the present invention a new class of organic compositions is described which are useful as additives for mineral lubricating oils, particularly those which are used in internal combustion engines, in which they act as pour depressing and pour stabilizing agents, also as inhibitors of oxidation and as detergents.

The new class of additives has been found not only to be effective in substantially reducing the ASTM pour point of a lubricating oil, but also in many cases in stabilizing the pour points, thus providing a stable lubricating oil which will not solidify under conditions of fluctuating temperature involved in normal outdoor conditions. The new additives of the present invention have been submitted to tests which simulate the normal varying temperature conditions encountered in winter field service, and satisfactory results were obtained from their use, as will be explained more particularly hereinafter.

In serving as inhibitors of oil deterioration, the new additives aid in the prevention of ring sticking, piston skirt varnish formation, deposition of sludge, and the like. They are particularly useful in inhibiting the normal corrosiveness of the oil when in contact with copper-lead, cadmium-silver and other similar bearings, now widely used in automotive engines.

The new class of compounds which are employed as additives in accordance with the present invention are organo phosphorous, phosphoric, thiophosphorous and thiophosphoric acids, derived by reacting an oxide or sulfide of phosphorus with a mixture of a wax-phenol and an aliphatic alcohol, also metal salts of such acids. It has been found that the product derived from a mixture of wax-phenol and an alcohol is superior to similar products derived from wax-phenol or other alkylated phenols alone in possessing superior oil solubility. It is believed that the presence of the alcohol prevents the formation of products of too high molecular weight. The salts, because of their metal content, have a detergent action in internal combustion engines in addition to the properties described above.

When the mixture of wax-phenol and alcohol is reacted with phosphorus pentasulfide, it is believed that the reaction proceeds according to the following equation:

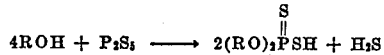

In the above equation R represents the wax-phenol radical and/or the aliphatic radical from the alcohol, the equation representing a statistical average of reactions among the various molecules. Undoubtedly in many cases the phosphoric acid molecule will contain both the wax-phenol radical and the aliphatic radical from the alcohol.

The wax-phenols employed in accordance with the present invention may be derived in the usual manner by first chlorinating paraffin wax and then reacting the latter with phenol. The aliphatic alcohols which are employed in conjunction with such phenols may be any aliphatic alcohols, particularly suitable examples being methyl alcohol, ethyl alcohol, isopropyl alcohol, octyl alcohol, decyl alcohol, stearyl alcohol, oleyl alcohol, and the like. The mixture of wax-phenol and alcohol may be reacted with any of the oxides or sulfides of phosphorus, such as $P_2O_3$, $P_2O_4$, $P_2O_5$, $P_2S_3$, $P_2S_5$, $P_4S_3$, or $P_4S_7$.

The ratio of alcohol to phenol may be varied within wide limits. The higher the molecular weight of the wax-phenol, the higher the ratio has to be in order to obtain satisfactory oil solubility. Generally, a preferred ratio is one to two wax-phenol hydroxyl groups to one molecule of alcohol.

When reacting the mixture of wax-phenol and alcohol with an oxide or sulfide of phosphorus, the reactants may be used in any ratio, but it is generally desirable to employ an amount of phosphorus compound slightly more than the amount required to react with all of the hydroxyl groups of the wax-phenol and alcohol present, such amount being one molecule of the phosphorus compound for each four hydroxyl groups. A greater amount of phosphorus compound will not adversely affect the reaction but will remain unreacted.

The temperature of the reaction is not critical, but for convenience in obtaining a reaction within a reasonable time it is advisable to employ temperatures ranging from about 50° to about 150° C., and a suitable solvent should be chosen with this in view. At the temperatures mentioned the reaction may be expected to be completed within 2½ to 7 hours, the completion of the reaction being indicated by the solution of all of the phosphorus oxide or sulfide which has been added, or by the cessation of the evolution of hydrogen sulfide.

The organo-substituted acids of phosphorus, formed as described above, may be conveniently converted into metal salts by reacting them with metallic bases, oxides, alcoholates, and the like. Salts of all of the metals are valuable in accordance with the present invention, but those derived from metals of groups II, III and VIII of the periodic table are particularly useful and may be readily obtained. The salts of group II metals are readily obtainable on a commercial scale and these salts may be considered to be of outstanding importance.

In employing the additives of the present invention for use either as pour depressants or as corrosion inhibitors, it has been found desirable to use the same in the proportions of about 0.02% to 3%, preferably about 0.1% to 2%, based on the lubricating oil base stock.

In the following examples are illustrated methods for the preparation of typical products of the present invention, and tests of the same illustrating their usefulness when compounded with mineral lubricating oils. It is to be understood that these examples are illustrative only and are not to be considered as limiting the scope of the invention in any way.

*Example 1.—Preparation of substituted thiophosphoric acid*

A three-way flask equipped with a stirrer and return condenser was charged with 51 g. (0.1 mol) of wax-phenol (prepared by heating 450 g. of chloroparaffin containing 14% Cl with 90 g. phenol in the presence of $AlCl_3$), 15.8 g. (0.1 mol) decanol (decyl alcohol), 22.2 g. (0.1 mol) $P_2S_5$, and 150 cc. dioxane. (The amounts of wax-phenol and decanol were calculated to provide approximately one wax-phenol molecule for each molecule of decanol.) The mixture was refluxed until no more $H_2S$ was given off (about 20 hours). The reaction product was then cooled and filtered. The solvents were removed at 100° C. and 2 mm. pressure. The residue, a red viscous oil, consisted of the desired di-wax-phenol dithiophosphoric acid.

*Example 2.—Preparation of calcium salt of substituted thiophosphoric acid*

The reaction product of Example 1 was then dissolved in about three volumes of ether and transferred to a large beaker containing a volume of water equal approximately to the volume of the ether solution. Then while the mixture was rapidly stirred, a slight excess of hydrated lime was added. The mixture was stirred until the aqueous solution remained permanently alkaline to litmus. The ether layer was then separated from the water layer and the extract was dried over $CaCl_2$. The ether was removed on the steam bath and the residue taken up with acetone. The small amount of undissolved material was filtered off and the acetone was removed at 100° C. under 2 mm. pressure. The product was obtained as a soft resin readily soluble in lubricating oils. Analysis:

Found _____ Ca=4.21% S=5.19%
Calculated _____ Ca=3.11% S=4.98%

*Example 3.—Preparation of substituted phosphoric acid*

A three-way flask equipped with a stirrer and return condenser was charged with 117 g. of the wax-phenol used in Examples 1 and 2. To this was added 15.8 g. n-decanol and 100 cc. xylol. The mixture was stirred until a homogeneous mixture was obtained, whereupon 14.2 g. of $P_2O_5$ was added. This mixture was refluxed for about 1 hour, during which time the $P_2O_5$ had completely dissolved. The reaction mixture was then transferred to a distilling flask and the xylol was removed at 100° C. and 3 mm. pressure.

*Example 4.—Preparation of calcium salt of substituted phosphoric acid*

The product obtained as described in Example 3 was dissolved in three volumes of ether, diluted with about two volumes of water and treated with a slight excess of slaked lime. The mixture was stirred until the aqueous layer remained permanently alkaline to litmus. The ether layer was separated from the aqueous layer and the extract dried over $CaCl_2$. On removal of the ether, a light-colored soft resin was obtained which was readily soluble in lubricating oils.

*Example 5.—Pour point and pour stability tests*

In these tests the ASTM pour point and the solid point as determined by the pour stability test described below were measured, using various concentrations of the products of Examples 2 and 4 in a waxy base mineral lubricating oil consisting of an acid-treated Mid-Continent neutral oil with the addition of 3½% of conventionally refined Pennsylvania bright stock, this oil having a viscosity of SAE 10 grade, an ASTM pour point of +30° F. and a cloud point of +34° F.

The pour stability of the various oil blends containing the new additives was determined by a test in which the temperature was varied to simulate rather severe winter temperature conditions. More specifically, the samples were first gradually reduced in temperature from room temperature to +15° F. during the first day of the test, then warmed gradually to 45–50° F. during the second day, then held at about 35° F. for two days, these temperatures being close to the cloud points of the oil samples, and finally the temperature was gradually lowered to −20° to −25° F. during the last 24 hours. The temperature at which the oil samples became solid under these conditions was taken as the "solid point." The results obtained with the tests applied to the unblended base oil and to the same when blended with various concentrations of the original wax-phenols and with the products of Examples 2 and 4 are shown in the following table:

| Oil Blend | ASTM Pour Point, °F. | Pour Stability (Solid Point), °F. |
|---|---|---|
| Base Oil | +30 | >+20 |
| Base Oil +1% Product of Example 1 | −10 | −22 |
| Base Oil +1% Product of Example 2 | −20 | −22 |
| Base Oil +1% Product of Example 4 | −30 | +15 |

*Example 6.—Bearing corrosion test*

A test was made of the effect of the products of Examples 2 and 4 in reducing the corrosiveness of a lubricating oil toward a copper-lead bearing, using a blend containing 1% of the additive in a solvent extracted Mid-Continent paraffinic lubricating oil of SAE 20 viscosity grade. A similar test was made of the unblended base oil. The test was conducted as follows: 500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° C. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each 4-hour period the bearings were removed, washed with naphtha and weighed to determine the amount of loss by corrosion. The bearings were then repolished (to increase the severity of the test), reweighed, and then subjected to the test for additional 4-hour periods in like manner. The results are given in the following table as "corrosion life," which indicates the number of hours required for the bearings to lose 100 mg. in weight, determined by interpolation of the data obtained in the various periods.

| Oil Blend | Bearing Corrosion Life, Hours |
| --- | --- |
| Base Oil | 4 |
| Base Oil+½% Product of Example 1 | 36 |
| Base Oil+1% Product of Example 2 | 20 |
| Base Oil+1% Product of Example 4 | 12 |

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocarbamates, amines and amine derivatives, reaction products of metal phenates and sulfur, reaction products of metal phenates and phosphorus sulfides, metal phenol sulfonates, and the like. Thus, the organo-substituted acids of phosphorus and salts of the present invention may be used in lubricating oils containing such addition agents as barium tert.-octyl phenol sulfide, calcium tert.-amyl phenol sulfide, nickle oleate, barium octadecylate, calcium phenyl stearate, zinc diisopropyl salicylate, aluminum naphthenate, calcium cetyl phosphate, barium di-tert.-amyl phenol sulfide, calcium petroleum sulfonate, zinc methyl cyclohexyl thiophosphate, calcium dichlorostearate, etc.

The lubricating oil base stocks used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or voltolized products may be employed in admixture with mineral oils.

For the best results the base stock chosen should normally be that oil which without the new additive present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubricating of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in aviation engine and other gasoline engine service, oils of higher viscosity index are often preferred, for example, up to 75 to 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like may also be employed.

Assisting agents which are particularly desirable as plasticizers and defoamers are the higher alcohols having eight or more carbon atoms and preferably 12 to 20 carbon atoms. The alcohols may be saturated straight and branched chain aliphatic alcohols such as octyl alcohol ($C_8H_{17}OH$), lauryl alcohol ($C_{12}H_{25}OH$), cetyl alcohol ($C_{16}H_{33}OH$), stearyl alcohol, sometimes referred to as octadecyl alcohol ($C_{18}H_{37}OH$), heptadecyl alcohol ($C_{17}H_{35}OH$), and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbons atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

In addition to being employed in crankcase lubricants the additives of the present invention may also be used in extreme pressure lubricants, engine flushing oils, industrial oils, general machinery oils, process oils, rust preventive compositions and greases.

The present invention is not to be considered as limited by any of the examples herein described, which are given by way of illustration only, but it is to be limited solely by the terms of the appended claims.

I claim:

1. A mineral lubricating oil containing about 0.02% to about 3% of a metal salt of an organo-substituted thiophosphoric acid obtained by reacting phosphorus pentasulfide with a mixture of wax-phenol and an aliphatic alcohol, the amount of phosphorus pentasulfide being the equivalent to at least 1 molecule for each 4 hydroxyl groups in the wax-phenol and alcohol present, at a temperature of 50 to 150° C.

2. A lubricating oil according to claim 1 in which the pour depressor is a salt of a metal of group II of the periodic table.

3. A lubricating oil according to claim 1 in which the aliphatic alcohol is decanol.

4. A lubricating oil according to claim 1 in which the aliphatic alcohol is decanol and in which the final reaction product is a calcium salt.

5. A mineral lubricating oil containing about 0.02% to about 3% of the product obtained by reacting one molecular proportion of phosphorus pentasulfide with about two molecular proportions of wax-phenol and one molecular proportion of decanol at a temperature of 50 to 150° C., and converting the product thus formed into the calcium salt.

6. A mineral lubricating oil containing about 0.02% to about 3% of the product obtained by reacting one molecular proportion of phosphorus pentoxide with about 4.5 molecular proportions of wax-phenol and one molecular proportion of decanol in xylol solution at the refluxing temperature of the solution and within the temperature range of 50–150° C. and converting the product thus formed into the calcium salt.

7. As a new composition of matter a metal salt of an organo-substituted thiophosphoric acid obtained by reacting phosphorus pentasulfide with a mixture of wax-phenol and an aliphatic alcohol, the amount of phosphorus pentasulfide being equivalent to at least 1 molecule for each 4 hydroxyl groups in the wax-phenol and alcohol present, at a temperature of 50 to 150° C.

8. As a new composition of matter the calcium salt of the product obtained by reacting one molecular proportion of phosphorus pentasulfide with a mixture of about two molecular proportions of wax-phenol and one molecular proportion of decanol at a temperature of 50 to 150° C.

9. As a new composition of matter the calcium salt of a product obtained by reacting a mixture of substantially equal molecular proportions of wax-phenol and decanol with an amount of phosphorus pentasulfide at least equivalent to one molecule for each four hydroxyl groups in the wax-phenol and decanol.

10. As a new composition of matter the calcium salt of a product obtained by reacting a mixture of about 4.5 molecular proportions of wax-phenol and one molecular proportion of decanol with about one molecular proportion of phosphorus pentoxide in xylol solution at refluxing temperature and within the temperature range of 50–150° C.

11. The method which comprises reacting together approximately equal molecular proportions of wax-phenol, decanol and phosphorus pentasulfide in dioxane solution at refluxing temperature and within the temperature range of 50–150° C., and neutralizing the product thus formed with hydrated lime.

12. The method which comprises reacting together about four molecular proportions of wax-phenol, about one molecular proportion of decanol, and about one molecular proportion of phosphorus pentoxide in xylol solution at refluxing temperature and within the temperature range of 50–150° C. neutralizing the product obtained with hydrated lime.

13. A mineral lubricating oil containing about 0.02% to about 3% of a metal salt of a product obtained by reacting a mixture of wax-phenol and an aliphatic alcohol with a compound selected from the class consisting of oxides and sulfides of phosphorus, such compound being reacted in an amount equivalent to at least one molecule for each 4 hydroxyl groups in the wax-phenol and alcohol present and at a temperature of 50 to 150° C.

14. A mineral lubricating oil according to claim 13 in which the pour depressor is a salt of a metal of group II of the periodic table.

15. As a new composition of matter, a metal salt of a product obtained by reacting a mixture of wax-phenol and an aliphatic alcohol with a compound selected from the class consisting of oxides and sulfides of phosphorus, such compound being reacted in an amount equivalent to at least one molecule for each 4 hydroxyl groups in the wax-phenol and alcohol present and at a temperature of 50 to 150° C.

LOUIS A. MIKESKA.

REFERENCES CITED

The following references are of record in the file of this patent:

UNITED STATES PATENTS

| Number | Name | Date |
| --- | --- | --- |
| 2,063,629 | Salzberg | Dec. 8, 1936 |
| 2,177,923 | Berger et al. | Oct. 31, 1939 |
| 2,364,284 | Freuler | Dec. 5, 1944 |
| 2,365,938 | Cook et al. | Dec. 26, 1944 |
| 2,396,719 | Musselman et al. | Mar. 19, 1946 |